March 13, 1962  J. H. GLENN  3,024,675
EASY SET DRILL PRESS FIXTURE
Filed Feb. 10, 1960  2 Sheets-Sheet 1
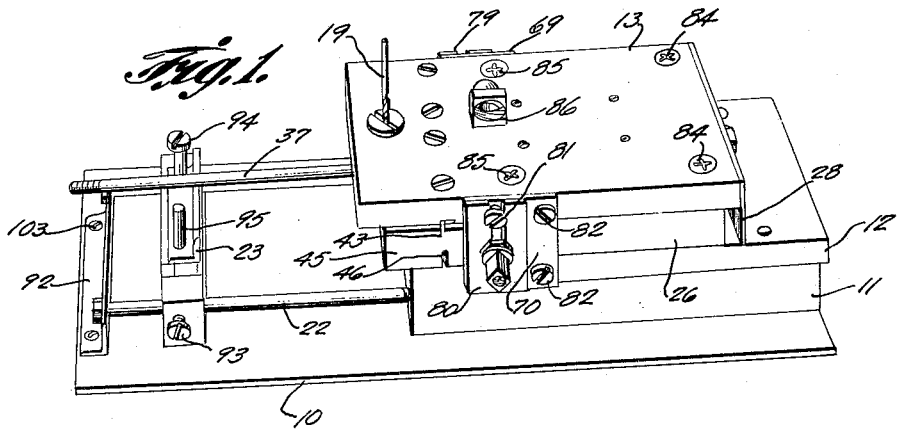
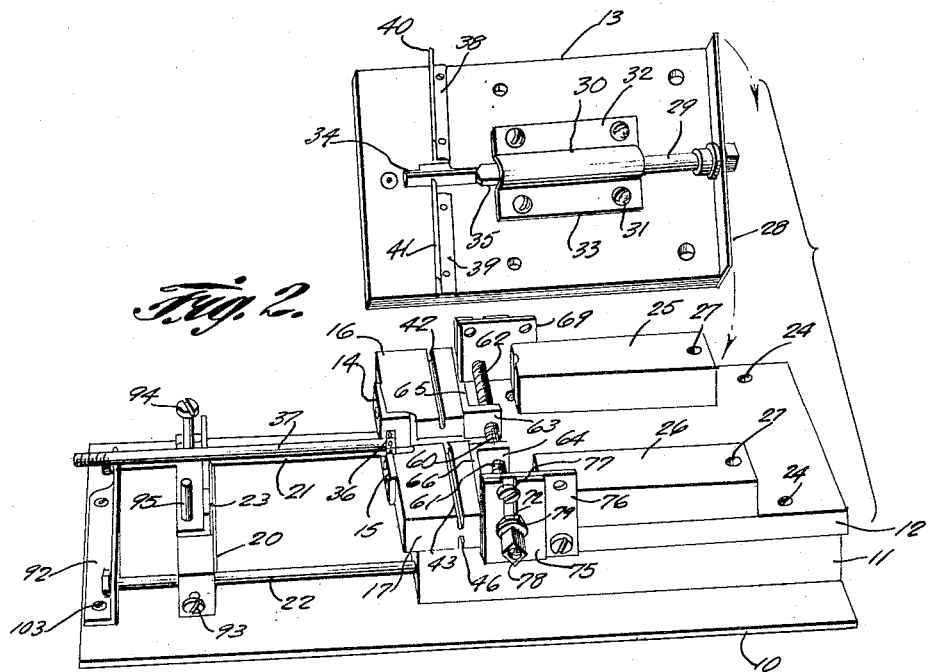
INVENTOR.
John H. Glenn
BY
Victor J. Evans & Co.
ATTORNEYS March 13, 1962 J. H. GLENN 3,024,675
EASY SET DRILL PRESS FIXTURE
Filed Feb. 10, 1960 2 Sheets-Sheet 2
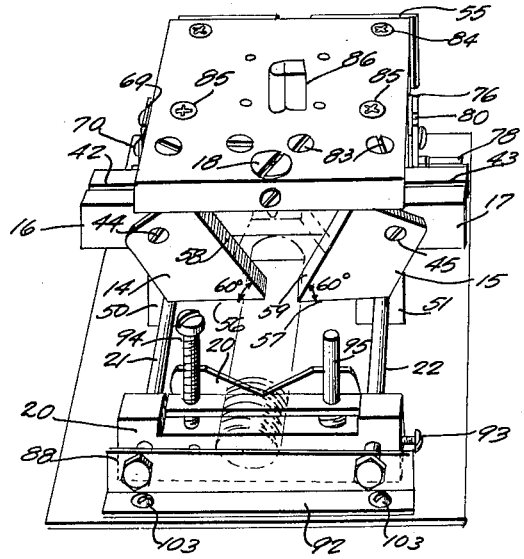
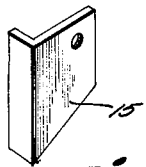
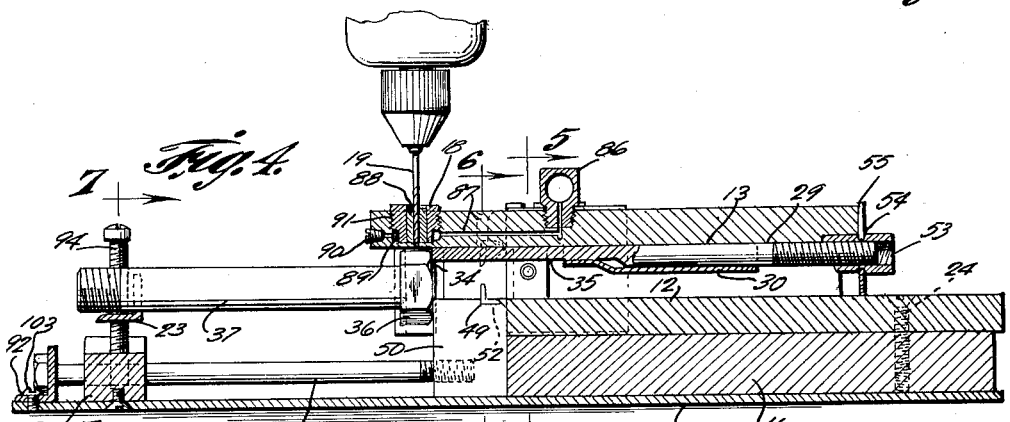
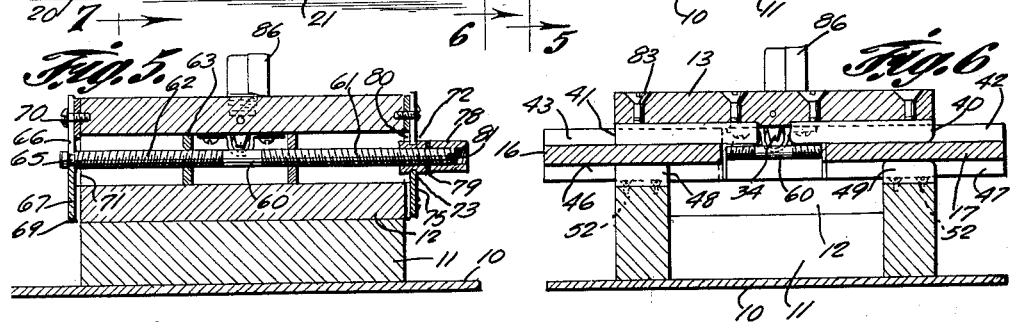
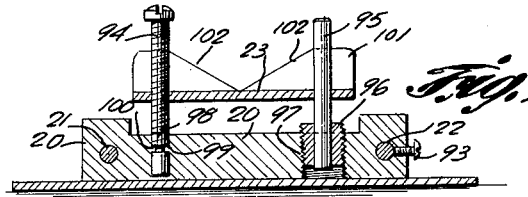
INVENTOR.
John H. Glenn
BY
Victor J. Evans & Co.
ATTORNEYS

United States Patent Office 3,024,675
Patented Mar. 13, 1962

3,024,675
EASY SET DRILL PRESS FIXTURE
John H. Glenn, 2526 S. Rimpau Blvd., Los Angeles, Calif.
Filed Feb. 10, 1960, Ser. No. 7,826
3 Claims. (Cl. 77—62)

This invention relates to jigs or adapters for use in drill presses and the like, and in particular a jig or fixture for retaining heads of bolts in position for drilling holes therethrough and particularly wherein it is desirable to adjust the position of the head of a bolt so that the a hole may be drilled, selectively, in spaced relation to the outer or inner surface of the head.

The purpose of this invention is to provide means for receiving the head of a bolt to facilitate drilling holes through the head and wherein the position of the head in relation to the drill is readily adjusted.

Various types of jigs other fixtures have been provided for adjustably holding work in relation to drills, cutting tools, and the like and whereas such fixtures are suitable for gripping square or round objects it is difficult to grip an object having flat sides, such as a hexagon, or head of a bolt without accurately setting gripping elements of the fixture. With this thought in mind this invention contemplates a pair of jaws providing side retaining element of a V-shaped socket in which inner surfaces of the jaws are positioned at sixty degrees to a horizontal plane, and an adjustable support for the shank of a bolt, the head of which is supported by the jaws whereby a drill extended through gripping elements of the head is positioned to drill an opening through the head with the opening at an angle of ninety degrees in relation to the axis of the shank.

The object of this invention is, therefore, to provide a fixture or jig for holding bolts to facilitate drilling openings through heads thereof in which the position of the bolt is readily adjusted in the fixture.

Another object of the invention is to provide means for holding bolts to facilitate drilling openings through heads thereof in which the position of the head is adjustable longitudinally so that openings may be drilled close to outer or inner faces thereof.

Another important object of the invention is to provide a fixture for holding bolts in position for drilling openings through heads thereof in which the fixture may readily be installed on a drill press or the like.

A further object of the invention is to provide a fixture for adjustably holding bolts for drilling the heads in which the fixture is of a simple and economical construction.

With these and other objects and advantages in view the invention embodies an elongated base plate, an intermediate plate positioned on one end of the base plate, a top plate mounted on the intermediate plate and extended beyond the inner end thereof, a cover positioned on the top plate, an adjustable bolt shank rest slidably mounted on rods extended from the intermediate plate and positioned on the base plate, and bolt head retaining jaws positioned on the inner end of the top plate.

Other features and advantages of the invention will appear from the following description taken in connection with the drawings, wherein:

FIGURE 1 is a perspective view looking toward one side of the fixture and showing a drill positioned in a bushing in the cover.

FIGURE 2 is a view similar to that shown in FIGURE 1 with the cover removed and illustrated in an inverted position.

FIGURE 3 is a perspective view looking toward the front or bolt retaining end of the fixture.

FIGURE 4 is a longitudinal section through the fixture illustrating the position of a bolt with the head thereof positioned to receive a drill.

FIGURE 5 is a cross-section through the fixture taken on line 5—5 of FIGURE 4 showing centering screws in the sides of the top plate for adjusting the position of the head of a bolt in the mounting jaws.

FIGURE 6 is a cross-section through the fixture taken on line 6—6 of FIGURE 4 showing the mounting or angle bars on the under side of the cover of the fixture, the angle bars being positioned whereby vertical legs thereof extend into slots of jaw mounting blocks of the fixture.

FIGURE 7 is a longitudinal section through the bolt shank rest taken on line 7—7 of FIGURE 4.

FIGURE 8 is a view showing one of the bolt head receiving jaws mounted on outer faces of the blocks and positioned to support the head of a bolt as an opening is drilled through the head.

Referring now to the drawings wherein like reference characters denote corresponding parts the improved bolt head drilling fixture or jig of this invention includes a base plate 10, an intermediate plate 11, a top plate 12, a cover 13, bolt head gripping jaws 14 and 15, sliding blocks 16 and 17 upon which the jaws are mounted, a bushing 18 mounted in the cover and positioned to form a guide for a drill 19 and a bolt shank rest 20 slidably mounted on rods 21 and 22 extended from the base plate and having a cradle 23 adjustably mounted on the rest 20.

The intermediate plate 11 is secured to the base plate 10 by welding, or the like, and the top plate 12 is secured to the intermediate plate by screws 24. The cover 13 is secured, such as by welding to blocks 25 and 26 on the top plate 12 and the blocks are secured in position on the top plate by screws positioned in openings 27.

The inner or rear end of the cover 13 is provided with a plate 28 and the plate provides mounting means for the inner end of a rod 29 that extends through a bearing 30 secured to the under surface of the cover 13 by screws 31 in flanges 32 and 33 and the opposite end of the rod 29 is provided with a stop 34 which extends from a shank 35 and the stop 34 is positioned to engage the end surface of a head 36 of a bolt 37 to facilitate spacing a hole formed by the drill 19 in the head 36 of the bolt from the outer or inner surface of the head.

The cover 13 is also provided with angle irons 38 and 39 having depending flanges 40 and 41, respectively and the angle irons are positioned whereby the flanges extend into slots 42 and 43 of blocks 16 and 17 upon which the jaws 15 are mounted. The blocks 16 and 17 are provided with similar slots 46 and 47 in the under surfaces whereby the blocks may be positioned by angle irons 48 and 49 secured to upper ends of posts 50 and 51 by screws 52.

The position of the stop 34 is adjusted by an adjusting nut 53 threaded on the outer end of the rod 29 and provided with an annular recess 54 which is positioned in a slot 55 of the plate 28 depending from the inner edge of the cover.

The jaws 14 and 15 are provided with horizontal lower surfaces 56 and 57 and beveled or inclined inner surfaces 58 and 59 positioned at angles of sixty degrees in relation to the surfaces 56 and 57 and, consequently, positioned to receive surfaces of a hexagonal bolt head. The jaws 14 and 15 and blocks 16 and 17 upon which the jaws are mounted by screws 44 and 45 are adjusted laterally by an adjusting screw 60 having right hand threads on the end 61 and left hand threads on the opposite end 62 and the screw extends through flanges 63 of clip angles 64 on the blocks 16 and 17, respectively.

The screw 60 is mounted, as illustrated in FIGURE 5, with an annular groove 65 in the end 62 in a slot 66 in a plate 67 and the plate 67 is secured to the plate 69 by screws 70. The end 62 of the screw 60 extends through a slot 71 in the plate 69.

The opposite end 61 of the screw 60 extends through an adjusting nut 72, which is threaded on the screw, and the outer surface of the adjusting nut is provided with an annular groove 73 that is positioned in a slot 74 in a plate 75 that is secured to a plate 76 by screws 77.

The end 61 of the screw 60 extends outwardly from the plates 75 and 76 and the extended end is provided with a lock nut 78 having a square outer surface, to facilitate holding the nut as the adjusting nut 72 is rotated. A lock washer 79 is provided between the adjusting nut 72 and the lock nut 78. The adjusting nut 72 extends through a slot 80 in the plate 76, and the lock nut is of sufficient length to extend beyond the end 61 of the screw 60 to provide means for retaining a screw driver bit in a slot 81 in the end of the screw as the nut 72 is adjusted. The plates 69 and 76 are secured to the cover 13 and top plate 12 by screws 82.

The cover 13 is secured in position by screws 83 positioned in the outer end, as shown in FIGURE 6 and also by screws 84 extended through the opposite end and threaded into the blocks 25 and 26. The cover is also secured to the top plate 12 by screws 85.

The cover 13 is also provided with an oil or lubricating fitting 86 from which a channel 87 extends to the drill bit bushing 18 in which is a guide 88. The bushing 18 is provided with an annular recess 89 and the inner end of the channel 87 is closed by a plug 90. The bushing 18 is threaded in an opening 91 in the cover 13.

The rods 21 and 22 are threaded in the posts 50 and 51 and the outer ends are supported in a flange of an angle bar 92 on the outer end of the base plate 10 and the rest 20 is slidably mounted on the rods. The rest 20 is secured in adjusted positions by a set screw 93, as shown in FIGURE 7. The cradle 23 is positioned on a screw 94 and a post 95 and with the screw threaded in the base of the cradle the cradle may be elevated or lowered to adjust the position of the head of a bolt in which it is desired to drill a hole. The lower end of the post 95 is secured in a bushing 96 that is threaded in an opening 97 in the rest 20. The screw 94 is provided with a smooth lower end 98 having an annular recess 99 therein and the screw is retained in position by a pin 100 extended through the rest 20 and positioned in the recess 99. An upwardly extended flange 101 of the saddle 23 is provided with a notch having beveled or inclined surfaces 102, thereby providing means for centering the body or shank of a bolt in the rest or saddle.

The angle bar 92 which supports the extended ends of the rods 21 and 22 may be secured to the base plate 10 by screws 103, as shown in FIGURES 3 and 4.

The tool may be provided with a plurality of jaws, such as the jaws 14 and 15, with the jaws of different sizes so that the tool may be used for drilling a hole through heads of large and small bolts, as may be desired.

A bolt, such as the bolt 37, shown in FIGURE 4, may be positioned in the tool and the drill bit lowered to mark the position of the drill on the head of the bolt. The drill may then be removed and the nut 53 of the adjusting screw turned through one revolution or to any position desired so that a hole drilled by the bit 19 may be located in substantially any position in the head 36.

It will be understood that modifications, within the scope of the appended claims, may be made in the design and arrangement of the parts without departing from the spirit of the invention.

What is claimed is:

1. A bolt head drilling tool comprising an elongated base plate, a plurality of plates mounted on said base plate in superposed relation to said base plate and to each other, blocks mounted on the uppermost plate of said plurality of plates for laterally sliding movement on said uppermost plate, bolt head receiving jaws positioned on said blocks, means for adjusting the position of the blocks and the bolt head receiving jaws carried thereby laterally of the uppermost plate, means for adjusting the head of a bolt positioned in the jaws longitudinally of the base plate, a drill bit guide threadably mounted on the uppermost plate of said plurality of plates and positioned to guide a drill bit through a head of a bolt positioned in the jaws, and adjustable means for supporting the shank of the bolt in a horizontal position.

2. In a bolt head drilling tool, the combination which comprises an elongated base plate, an intermediate plate mounted on one end of the base plate, blocks mounted on said top plate for laterally sliding movement in relation thereto, a top plate mounted on the intermediate plate, spaced bolt head receiving jaws carried by said block, a cover mounted on said top plate, means positioned below the top plate for adjusting the blocks and the bolt head receiving jaws carried thereby laterally of the base, a drill bit guide mounted in the cover and positioned to direct a drill bit through the head of a bolt positioned in the jaws, a cradle for supporting the shank of a bolt, the head of which is positioned in the jaws, a rest upon which the cradle is adjustably supported, and means for adjusting the position of the rest on said base plate.

3. In a bolt head drilling jig, the combination which comprises an elongated base plate, an intermediate plate mounted on one end of the base plate, a top plate mounted on the intermediate plate, a cover mounted on said top plate, blocks with longitudinally disposed grooves in upper and lower surfaces positioned between the cover and top plate and positioned to slide laterally of the jig, bolt head receiving jaws carried by said blocks, an adjusting screw positioned between the cover and top plate and operatively connected to said blocks for sliding the blocks laterally of the base plate, a longitudinally disposed adjusting screw having a stop on one end mounted on the under surface of the cover and positioned whereby the stop engages the head of a bolt positioned between the jaws, a drill bit guide mounted in the cover and positioned in registering relation with a bolt head in the jaws and positioned against the stop of the adjusting screw, and a rest for adjustably supporting the extended end of the bolt whereby the axis of the bolt is parallel to the base plate.

References Cited in the file of this patent

UNITED STATES PATENTS

| 858,430 | Wheeler | July 2, 1907 |
| 2,379,028 | Morgenstern | June 26, 1945 |

OTHER REFERENCES

"American Machinist" Magazine, vol. 59, No. 19, page 710.